US005561782A

United States Patent [19]
O'Connor

[11] Patent Number: 5,561,782
[45] Date of Patent: Oct. 1, 1996

[54] PIPELINED CACHE SYSTEM HAVING LOW EFFECTIVE LATENCY FOR NONSEQUENTIAL ACCESSES

[75] Inventor: Dennis O'Connor, Chandler, Ariz.

[73] Assignee: Intel Corporation, Santa Clara, Calif.

[21] Appl. No.: 269,650

[22] Filed: Jun. 30, 1994

[51] Int. Cl.$^6$ ............................ G06F 9/32; G06F 13/00
[52] U.S. Cl. .................... 395/467; 395/375; 395/452; 395/464; 395/496; 364/231.8; 364/243.41; 364/261.3; 364/261.7; 364/263.1; 364/948; 364/964.24; 364/964.26; 364/D
[58] Field of Search ................................. 395/375, 452, 395/464, 467, 496; 364/231.8, 243.41, 261.3, 261.7, 263.1, 948, 964.24, 964.26

[56] References Cited

U.S. PATENT DOCUMENTS

| | | | |
|---|---|---|---|
| 4,847,753 | 7/1989 | Matsuo et al. | 395/375 |
| 4,912,635 | 3/1990 | Nishimukai et al. | 395/375 |
| 4,926,323 | 5/1990 | Baror et al. | 395/375 |
| 5,136,697 | 8/1992 | Johnson | 395/375 |
| 5,283,873 | 2/1994 | Steely, Jr. et al. | 395/375 |
| 5,337,415 | 8/1994 | DeLano et al. | 395/375 |

OTHER PUBLICATIONS

"*High Speed CMOS Microprocessor Final Report*", Avionic and Electronic Systems Division, General Electric Company, Syracuse, New York (Aug. 15, 1986), pp. 2–6 thru 2–10.

*Primary Examiner*—Frank J. Asta
*Attorney, Agent, or Firm*—Blakely, Sokoloff, Taylor & Zafman

[57] ABSTRACT

A method and apparatus for reducing the effective latency for nonsequential memory accesses is disclosed. An improved cache includes a multi-stage pipelined cache that provides at least one cache output record in response to a record address hitting the pipelined cache. The pipelined cache provides the record after an idle period of L clock cycles in which the pipelined cache provides no output records. The effective latency of the pipelined cache is reduced by providing a branch target cache (BTC) that issues at least one record during the idle period in response to a nonsequential record address hitting the BTC. The records stored in the caches may, for example, represent instructions. The cache further includes a lookahead circuit for providing the nonsequential record address (A) and a lookahead address (A+(L×W), where W denotes the issue width) to the pipelined cache during a zero cycle preceding the idle period. The pipelined cache respectively provides a nonsequential record and a lookahead record from the lookahead address after the idle period in response to the nonsequential record address and the lookahead address hitting the pipelined cache. A multiplexer selects the nonsequential record from the pipelined cache as an output if the nonsequential address misses the BTC. The multiplexer selects the lookahead record as the output if the nonsequential address hits the BTC. Various modifications of this technique are also described.

40 Claims, 4 Drawing Sheets

PIPELINED CACHE SYSTEM HAVING LOW EFFECTIVE LATENCY FOR NONSEQUENTIAL ACCESSES

BACKGROUND OF THE INVENTION

1. Field of the Invention

The present invention relates to data processing systems utilizing cache memories, and more particularly to reducing the effective latency for nonsequential accesses of a cache.

2. Prior Art

Caches are used in various forms to reduce the effective time required by a processor to access instructions or data that are stored in main memory. The theory of a cache is that a computer system attains a higher speed by using a small portion of very fast memory as a cache along with a larger amount of slower main memory. The cache memory is usually placed operationally between the data processing unit and the main memory. When the processor needs to access main memory, it looks first to the cache memory to see if the information required is available in the cache. When data and/or instructions are called from main memory, information is stored in the cache as part of a block of information (known as a cache line) that is taken from consecutive locations of main memory. During subsequent memory accesses to the same addresses, the processor interacts with the fast cache memory rather than main memory. Statistically, when information is accessed from a particular block in main memory, subsequent accesses most likely will call for information from within the same block. This locality of reference property results in a substantial decrease in average memory access time.

There are two major conflicting goals in designing caches. First, it is desired that cache size be large so that off-chip memory accesses in case of a cache miss are minimized. Second, as processor speeds increase, it becomes especially important that caches are designed to be fast enough to return instructions and data to the processor without slowing down overall system performance. Unfortunately, as the cache gets larger, it also gets slower due to an increase in the parasitic capacitance of the cache memory.

A number of techniques are used to reconcile these two goals. By dedicating the cache to only a certain type of data, one can reduce the relative size required of the cache. For example, many processors incorporate separate instruction and data caches. Further, because the pattern of access for instruction caches is typically sequential, the hit/miss ratio is relatively high. Thus, the need to go off-chip to retrieve instructions is reduced and performance is enhanced.

Two factors contribute to the measure of the speed of a cache. The latency of a cache is the delay (typically measured in processor cycles) between presenting an address to the cache and receiving the requested data from the cache. The throughput of the cache is a measure of the number of memory access operations that can be performed in any one time period. During the latency period, the cache may be considered to have an idle period in which no data is returned from the cache in response to the address. The duration, L, of the idle period is one cycle less than the latency period.

It is known in the art that pipelined memory systems can use prefetching to increase their throughput. The Intel i960CA™ and i960CF™ processors, manufactured by Intel Corporation of Santa Clara, Calif., are examples of processors that support pipelined memory systems. In particular, an instruction cache may be implemented as a two-stage pipelined cache, for example. During the first stage of the pipeline, an instruction address (instruction pointer) is presented to the tag array of the cache. The results are latched for one cycle, and during the second stage the memory access is continued by accessing the cache instruction array lines in the case of a hit, or accessing memory in the case of a miss. In other words, the instruction address may be presented in cycle one, the cache is in a wait state in cycle two, and if the instruction address hits the cache, the instruction is returned in cycle three.

The latency of the above-described pipelined cache is two cycles. However, the effective latency can be decreased to one cycle by prefetching instructions from subsequent sequential addresses during the idle cycle. During cycle 2, the instruction sequencer (program counter) increments the instruction pointer to point to the next instruction to be fetched, and presents this pointer address to the cache. As a result, the instruction found at the address presented in cycle one is returned in cycle three, and the subsequent instruction is returned in cycle four. Thus, the throughput of the cache has been increased by one hundred percent from one instruction every other cycle to one instruction per cycle.

One skilled in the art will recognize that the number of stages of the pipelined cache may take on a wide range to accommodate system requirements. Further, one skilled in the art will recognize that the number by which the instruction pointer is incremented during each pipeline stage may vary depending upon whether the processor is superscalar (issues multiple instructions per cycle), and the number of pipeline stages, among other factors. The only requirement is that the instruction pointer be incremented to point to the instruction immediately after the last instruction fetched in the previous cycle.

Using the method of sequentially prefetching the instruction from the pipelined cache, instruction throughput may be maintained at a relatively high rate. However, the pipelined cache suffers a performance penalty when nonsequential memory accesses are encountered. Nonsequential accesses include branches, calls and interrupts, among other changes in instruction flow. As mentioned above, the instruction sequencer causes instructions to be prefetched by sequentially incrementing the instruction pointer. When a branch instruction is encountered, however, instruction flow must be redirected to the target address specified by the branch instruction. The processor requires a number of cycles to decode the branch instruction to detect that a branch instruction has been encountered, and to determine the branch target address at which instruction flow is to continue. During this time period, the pipelined cache returns prefetched instructions that lie in the sequential instruction flow immediately after the branch instruction. After the branch has been detected, these prefetched instructions must be flushed or allowed to drain from the pipeline without being executed, and instruction flow must be redirected to the branch target address.

When the branch target address is presented to the pipelined cache, the instruction at that address will be returned after a time period equal to the latency of the pipelined cache. Because branch instructions occur at a rate of approximately one out of every five instructions in a typical computer program, this delay creates a severe degradation in instruction throughput. This degradation is exacerbated in superscalar machines where each cycle of latency represents the delay of not just one instruction but of many.

It is desired to enhance the performance of a pipelined cache by reducing the effective latency caused by nonsequential memory accesses.

SUMMARY OF THE INVENTION

The present invention provides a method and apparatus for reducing the effective latency for nonsequential memory accesses. An improved cache of the present invention includes a multi-stage pipelined cache that provides at least one cache output record in response to a record address hitting the pipelined cache. The pipelined cache provides the record after an idle period of L clock cycles in which the pipelined cache provides no output records. The present invention reduces the effective latency of the pipelined cache by providing a branch target cache (BTC) that issues at least one record during the idle period in response to a nonsequential record address hitting the BTC. The cache further includes a lookahead circuit for providing the nonsequential record address (A) and a lookahead address (A+(L×W), where W denotes the issue width) to the pipelined cache during a zero cycle preceding the idle period. The pipelined cache respectively provides a nonsequential record and a lookahead record from the lookahead address after the idle period in response to the nonsequential record address and the lookahead address hitting the pipelined cache. A multiplexer selects the nonsequential record from the pipelined cache as an output if the nonsequential address misses the BTC. The multiplexer selects the lookahead record as the output if the nonsequential address hits the BTC.

As an alternative, if the BTC tag hit logic is fast enough, the lookahead circuit provides only the lookahead address to the pipelined cache during the zero cycle if the nonsequential address hits the BTC. In that case the pipelined cache provides a lookahead record from the lookahead address after the idle period in response to the lookahead address hitting the pipelined cache. On the other hand, if the nonsequential address misses the BTC, the lookahead circuit provides the nonsequential record address to the pipelined cache during the zero cycle. In response to the nonsequential address hitting the pipelined cache, the pipelined cache provides a nonsequential record after the idle period.

In either embodiment, after the zero cycle the lookahead circuit provides to the pipelined cache at least one sequential record address subsequent to the lookahead address if the nonsequential address hits the BTC. If, however, the nonsequential address misses the BTC, then after the zero cycle the lookahead circuit provides to the pipelined cache at least one sequential record address subsequent to the nonsequential address. In response to the sequential record address provided by the lookahead circuit hitting the pipelined cache, the pipelined cache provides at least one record.

In the case of a multi-cycle idle period, during the first cycle of the idle period, the BTC provides a nonsequential record specified by the nonsequential record address. During remaining cycles of the idle period, the BTC provides sequential records from sequential record addresses subsequent to the nonsequential record address. In the case of a superscalar system having an issue width W, the BTC simultaneously provides W records during each cycle of the idle period.

After the idle period, the pipelined cache provides at least one sequential record from a sequential record address following the record address of the last record provided by the BTC in a preceding cycle. If, however, the BTC provides no records during the idle period, then the pipelined cache provides a nonsequential record after the idle period in response to the nonsequential record address hitting the pipelined cache.

The records stored in the caches preferably represent instructions. The nonsequential record address may be the target address of a branch instruction, the starting address of an interrupt handler, or the call or return address of a subroutine, for example.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a pipelined cache system having a low effective latency for nonsequential accesses. For purposes of explanation, specific details are set forth to provide a thorough understanding of the present invention. However, it will be apparent to one skilled in the art that the invention may be practiced without these details. In other instances, well-known elements, devices, process steps and the like are not set forth in detail in order to avoid obscuring the present invention.

Figure 1:
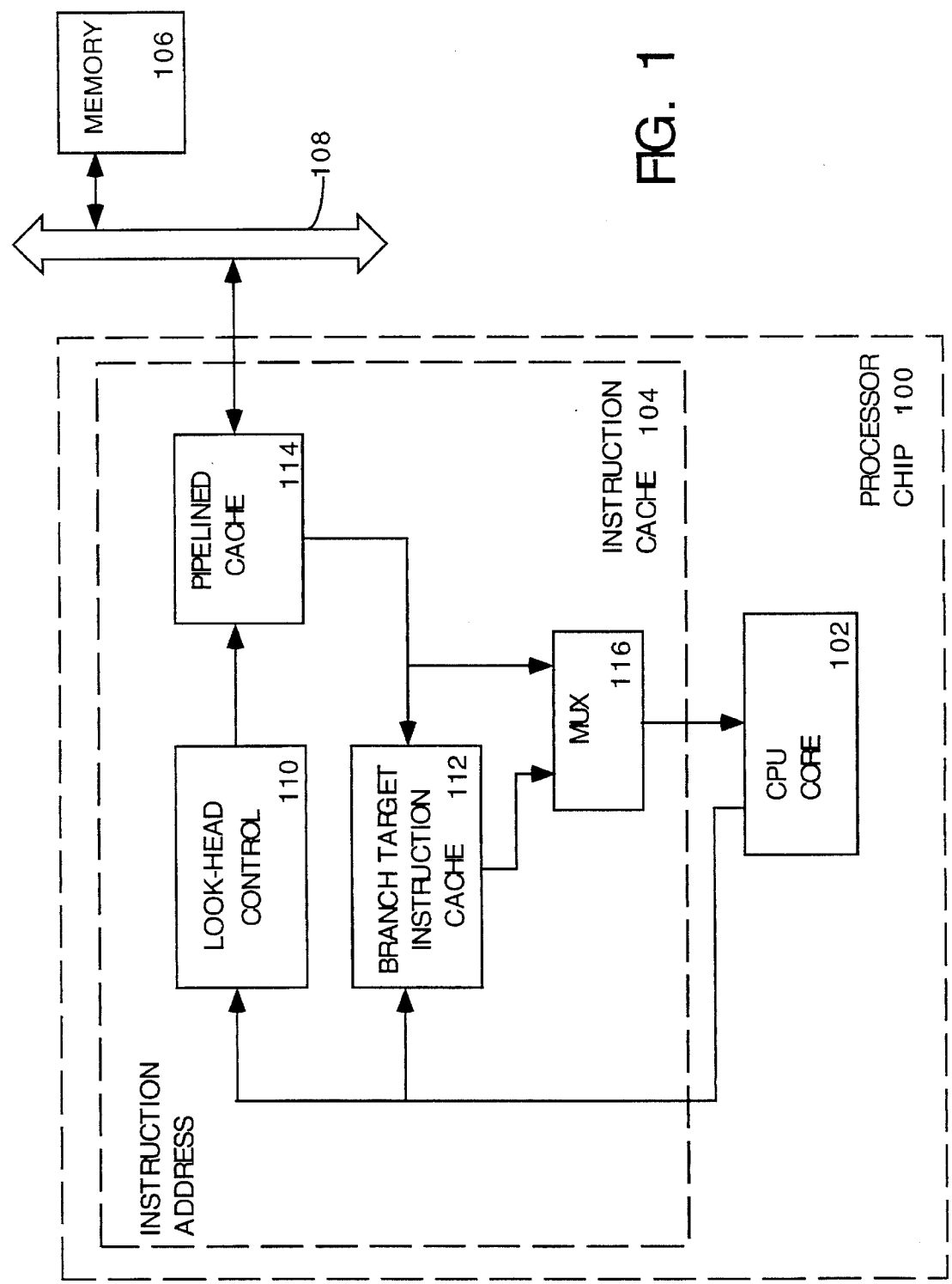
FIG. 1 illustrates a computer system incorporating the cache of the present invention.

FIG. 1 illustrates the pipelined cache architecture of the present invention. A processor chip 100 includes a CPU core 102 and an on-chip instruction cache 104 of the present invention. The instruction cache 104 is coupled to a memory device 106 over a memory bus 108. One skilled in the art will understand that a number of connections and components, such as a bus controller and a data cache, have been omitted from FIG. 1 to avoid unnecessarily complicating the present invention.

The instruction cache 104 includes a lookahead control circuit 110, a branch target instruction cache 112, a pipelined cache 114 and a multiplexer (MUX) 116. The pipelined cache 114 caches instructions used by the CPU core 102. It may be pipelined to have any number of stages. The branch target instruction cache (BTIC) 112 is a small, fast cache dedicated to taken branches, calls, returns, interrupts and other nonsequential accesses. It is only active when an address from one of those operations is sent to it by the processor core 102. Its purpose is to attempt to fill in the latency that the pipelined cache suffers due to a nonsequential access.

The lookahead control (LAC) circuit 110 controls the address presented to the pipelined cache 114. The CPU core 102 presents an address to the instruction cache 104 when a nonsequential access is to be executed. During other cycles, the address for the cache is produced by the LAC 110 by incrementing the previous instruction pointer by the number of instruction words consumed by the CPU core 102 during the idle period (assuming word-by-word addressing). When a nonsequential access is encountered, the branch address from the CPU core 102 is presented to the BTIC 112 to determine whether the instruction at a branch target address is cached in the BTIC 112. Simultaneously, the lookahead control unit 110 presents to the pipelined cache 114 both the branch target address, A, and a lookahead address A+N. The number N depends on the number of instructions that the CPU core 102 will consume during the idle period. For example, if the pipelined cache 114 exhibits a two-cycle latency (thus the idle period L=1 cycle), and the CPU core 102 is a superscalar processor having an issue width, W, of 3, then the lookahead unit 110 would lookahead by N=3 instructions. In general, the number N of "fill-in" instructions to be provided during the idle period by the BTIC 112 to the CPU core 102 is calculated as follows: N=L×W.

If the BTIC 112 gets a hit, then it provides the instructions required by the CPU core 102 during the idle period. Subsequent to the idle period, the pipelined cache 114 provides the instructions that follow, assuming they are in the pipelined cache 114. On the other hand, if the BTIC 112 misses, then no instructions are provided by the BTIC 112 and the processor stalls for the idle period. After the end of the idle period, the instructions at the branch target address are furnished by the pipelined cache 114 to the CPU core 102 and cached in the BTIC 112, assuming the instructions were cached in the pipelined cache 114. Otherwise, the instructions are provided from external memory 106 to the CPU core 102, and are cached in the BTIC 112 and the pipelined cache 114. One skilled in the art will recognize that, although the present invention is being described with respect to a branch target address, the operation of the present invention applies equally well to subroutine call and return addresses, interrupt handler addresses, as well as any other nonsequential access addresses. Further, the present invention applies not only to instruction caches but to caches holding any type of information records.

Figure 2:
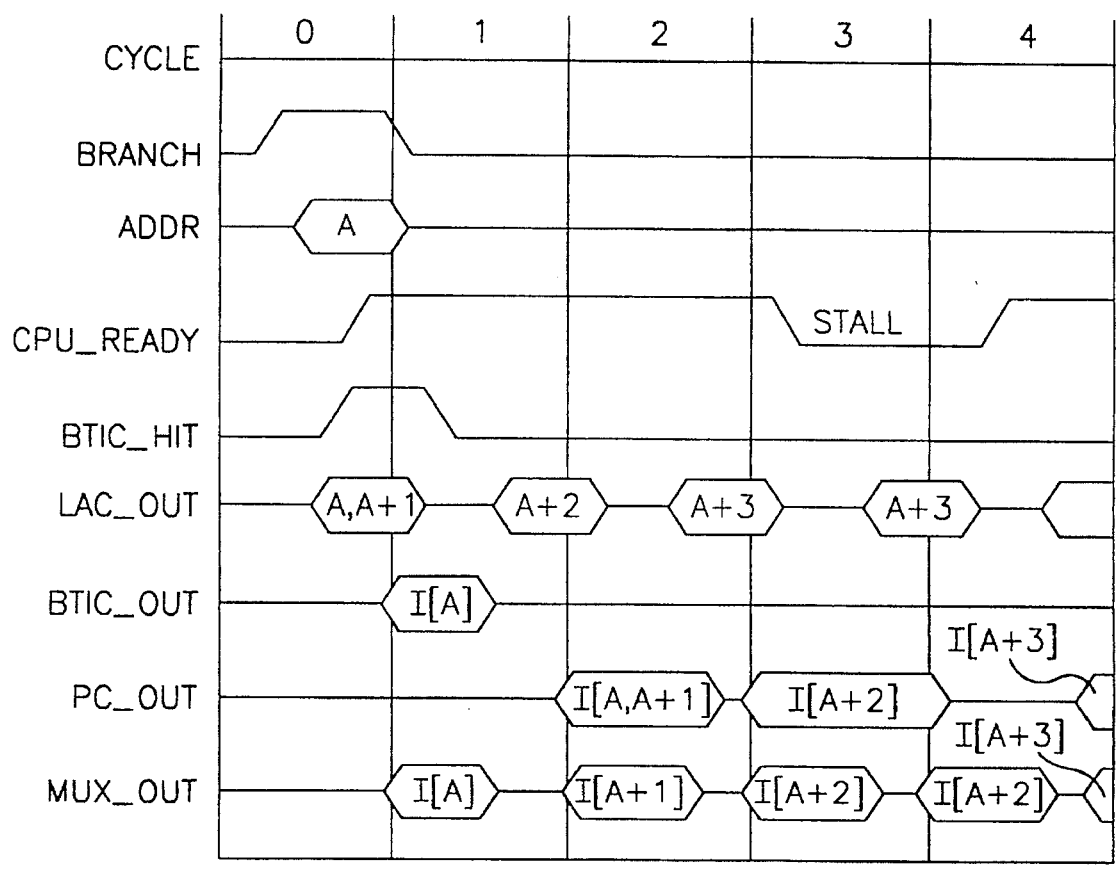
FIG. 2 is a timing diagram illustrating an example of the operation of the present invention for a two-stage pipelined cache in a scalar processor when a nonsequential record access hits the branch target cache.

The operation of the instruction cache of the present invention will be explained in more detail with reference to the timing diagrams of FIGS. 2 and 3. In the system exemplified by FIGS. 2 and 3, the example of this embodiment assumes a two-stage pipelined cached in a scalar processor (issue width equals 1). As shown in FIG. 2 a number of signals are exchanged between the CPU core 102 and the cache 104. A branch signal (active high) indicates that the CPU core 102 is requesting a nonsequential access. The CPU core 102 also provides the target address A of the nonsequential access, e.g., a branch, to the lookahead control unit 110 and the branch target instruction cache 112. A CPU_READY signal indicates that the CPU is ready to process information when it is high, and conversely that the CPU must be stalled when the CPU_READY signal falls low.

As shown in FIG. 2, the CPU core 102 is issuing a branch target address, A, in cycle 0. Because the pipelined cache 114 exhibits a latency of two cycles, the lookahead control circuit 110 issues the address A and the lookahead address A+N=A+(L×W)=A+(1×1)=A+1 (LAC_OUT). In the example of FIG. 2, the address A hits in the BTIC 112 as indicated by a high BTIC_HIT line in cycle 0. Because the BTIC 112 is a relatively fast, pipelined cache, it returns the instruction at address A, I[A], in cycle 1. In this manner, the BTIC 112 fills the idle period of the pipelined cache 114 during cycle 1.

In response to the BTIC hit, the MUX 116 selects the instruction I[A] for output (MUX_OUT) to the CPU core 102. The pipelined cache 114 is dual ported so that it can provide two instructions when presented with two corresponding addresses. In this example, in cycle 2, the pipelined cache 114 at PC_OUT returns the instructions at addresses A and A+1 after a two-cycle latency in response to being presented with those addresses in cycle 0 by the LAC 110. In cycle 2, because a BTIC hit was detected in a previous cycle, the MUX 116 selects only the instruction at address A+1 from the output of the pipelined cache 114. For cycles after cycle 0, the CPU core 102 is not presenting any further branch target addresses, in this example. Thus, for those subsequent cycles, the LAC 110 acts in a normal manner to provide sequential lookahead addresses at A+2 and A+3, etc. After the normal two-cycle latency, the pipelined cache 114 provides the instruction at address A+2 after being presented with that address by the LAC 110 in cycle 1, assuming a hit in the pipelined cache 114. During normal sequencing of instructions, the MUX 116 selects the output of the pipelined cache 114 to provide instructions to the CPU core 102. Note that the CPU_READY line goes low in cycle 3 to indicate a CPU stall. In that case, the CPU core 102 must postpone instruction processing. Thus, the pipelined cache 114 continues to output in the instruction at address A+2, and the LAC 110 continues to provide the lookahead address at A+3 until the stall is removed in cycle 4.

Figure 3:
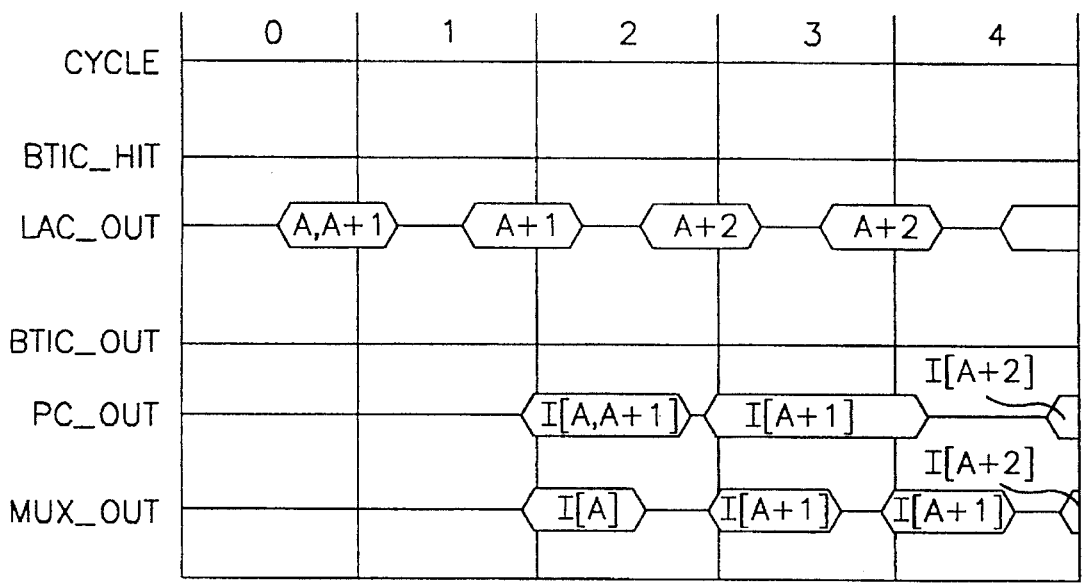
FIG. 3 is a timing diagram illustrating an example of the operation of the present invention for a two-stage pipelined cache in a scalar processor when a nonsequential record access misses the branch target cache.

FIG. 3 illustrates the case of a BTIC miss. In the case of a miss, the BTIC 112 is unable to fill cycle 1 with the instruction from address A. Instead, after a two-cycle latency, the MUX 116 selects the instruction I[A] from the output of the pipelined cache 114, assuming a pipelined cache hit. When the pipelined cache 114 returns an instruction, it is not only provided to the CPU core 102 but cached in the BTIC 112 for future memory accesses. Also, in response to the miss detected in cycle 0, the LAC 110 repeats the lookahead address A+1 in cycle 1, which results in the pipelined cache 114 returning the instruction at address A+1, assuming a hit in the pipelined cache 114. FIG. 3 also shows the effects of stalling, analogous to those of FIG. 2.

In another embodiment, the tag hit logic of the BTIC 112 may react fast enough to change the behavior of the lookahead control 110. For example, in FIG. 2, the LAC 110 must output both the branch target address A and the lookahead address A+1 to the pipelined cache 114. In cycle 0, the LAC 110 cannot be certain whether the BTIC will hit (requiring the pipelined cache to provide only I[A+1]), or miss (which would require the pipelined cache 114 to provide I[A] and I[A+1]). If however, the BTIC 112 were fast enough to inform the lookahead control circuit 110 of a hit in cycle 0, then the LAC 110 could decide whether or not to output both the branch and lookahead addresses, or just the lookahead address alone. In the case of a hit, it is known that I[A] is found in the BTIC 112, and thus there is no need to present address A to the pipelined cache 114. The LAC 110 would present only the lookahead address A+1 to the pipelined cache 114. Such fast BTIC tag logic would be represented in FIG. 2 by moving the BTIC hit signal to the left so that it reaches a logic high level before the LAC_OUT signal is asserted.

Similarly, in the case of a BTIC miss, the LAC 110 would know that it need only present the branch target address A to the pipelined cache 114 because the pipelined cache 114 would have the burden of providing I[A] in cycle 2 instead of the BTIC 112. Subsequent cycles would follow normal sequencing in the absence of any nonsequential accesses.

The discussion above assumed that the pipelined cache 114 would always register a hit in response to any address presented to it. Of course, if an address misses in both the BTIC 112 and the pipelined cache 114, the processor would be required to endure an indefinite number of wait states in order to wait for the desired instruction to return from main memory 106. Upon its return, the instruction would be cached in both the pipelined eachell4 and the BTIC 112.

Figure 4:
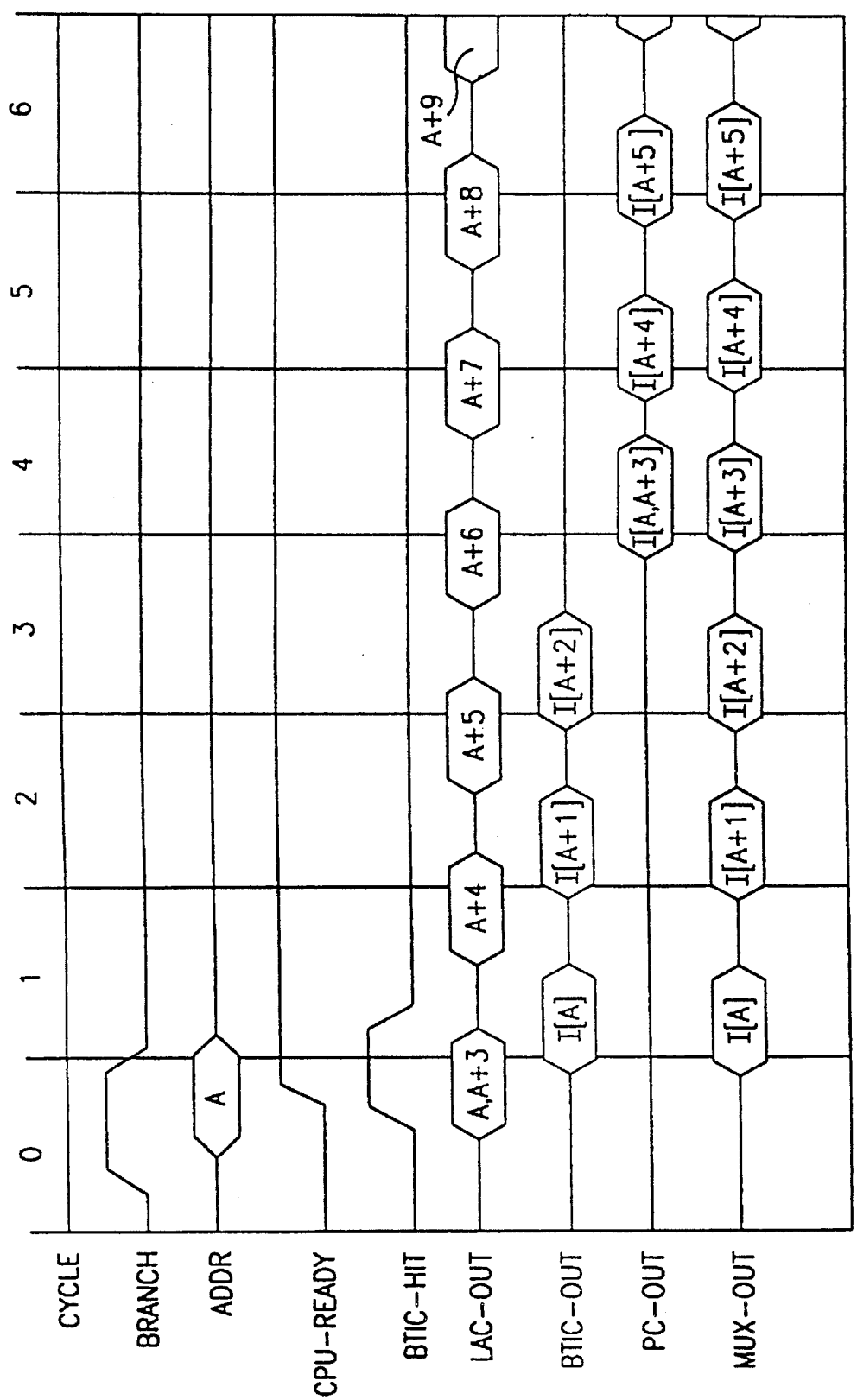
FIG. 4 is a timing diagram of the operation of the present invention for a four-stage pipelined cache in a scalar processor when the a nonsequential record access hits the branch target cache.
Figure 5:
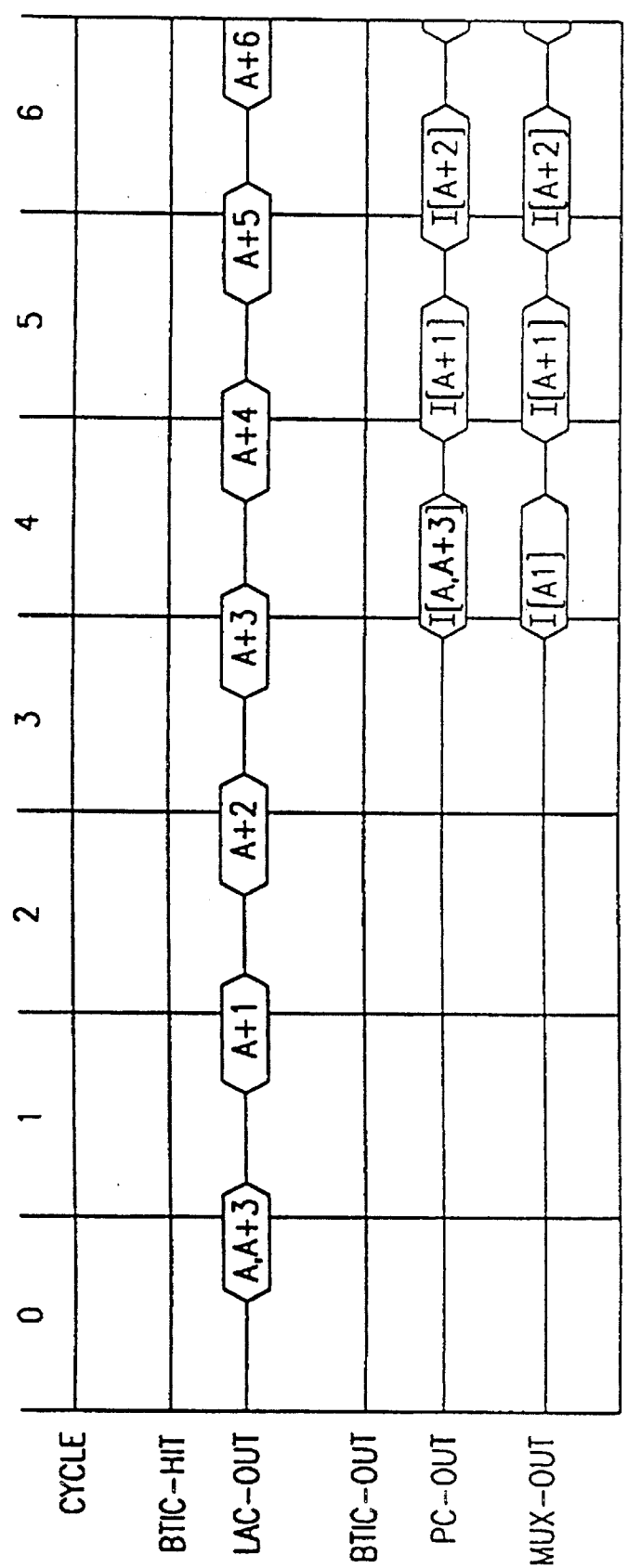
FIG. 5 is a timing diagram of the operation of the present invention for a four-stage pipelined cache in a scalar processor when the a nonsequential record access misses the branch target cache.

FIGS. 4 and 5 are timing diagrams respectively illustrating the results of a BTIC hit and a BTIC miss in the case of a four-stage pipelined cache 114 (idle time=three cycles) implemented in a scalar processor 100. In cycle 0 the lookahead control circuit 110 presents the branch target address A and the lookahead address A+N, where N=3, to the pipelined cache 114. The lookahead address A+3=A+(L×W)=A+(3×1) (for a scalar processor)=A+3. Alternatively, as discussed with respect to FIGS. 2 and 3, the lookahead control circuit 110 need only output the lookahead address in the case of a BTIC hit, and the branch target address in the case of a BTIC miss, if the BTIC tag hit logic is fast enough to indicate a hit or a miss to the lookahead control circuit 110 before the LAC 110 must output the lookahead address to the pipelined cache 114.

In this example, the idle period is three cycles, meaning that in response to the address presented in cycle 0, the pipelined cache 114 returns no instructions during cycles 1, 2 or 3. The performance of the pipelined cache 114 is enhanced by filling this idle period with instructions provided by the BTIC 112. In this case, when there is a BTIC hit, the BTIC 112 outputs instructions I[A], I[A+1] and I[A+2] during cycles 1, 2 and 3, respectively, in response to the branch target address received from the CPU core 102. The multiplexer 116 selects the BTIC 112 instruction output during the three-cycle idle period in the case of a BTIC hit. After the idle period has passed, the multiplexer 116 then selects the output of the pipelined cache 114.

If the branch target address A misses the BTIC 112, then the instruction at that address will not be returned by the pipelined cache 114 (assuming a hit in the pipelined cache) until cycle 4 because of the four-cycle latency.

The present invention employs a small, fast cache dedicated only to nonsequential accesses to fill processing time which would otherwise lay idle. This performance enhancement is especially beneficial in superscalar systems in which each idle cycle represents the lost opportunity to issue not just one, but many instructions. The performance penalty normally incurred by such idle time is exacerbated when using a multi-stage pipelined cache having a greater than one-cycle latency period. Accordingly, the ability of the present invention to fill up all this idle time provides a significant advantage over the prior art.

Although the invention has been described in conjunction with certain embodiments, it will be appreciated that various modifications and alterations may be made by those skilled in the art without departing from the spirit and scope of the invention. In particular, it is clear from the above discussion that the present invention is applicable to pipelined caches having any number of stages operating in processors that may be scalar or superscalar having any range of issue widths.

What is claimed is:

1. In a computer system for processing information, the system having a multistage pipelined cache for providing at least one cache output record in response to a record address that hits the pipelined cache, wherein the pipelined cache provides the at least one record after an idle period of L clock cycles in which the pipelined cache provides no output records, the system further having a branch target cache (BTC); a main memory; a sequencer for providing sequential record addresses to the pipelined cache; and a processor core for providing nonsequential record addresses of nonsequential records, a method for reducing the effective latency for nonsequential record access, the method comprising the steps of:

(a) providing the nonsequential record address, the nonsequential record address being provided by the processor core to the BTC;

(b) determining whether the nonsequential record address hits or misses the BTC;

(c) if the nonsequential record address hits the BTC, providing the nonsequential record therefrom during the idle period;

(d) if the nonsequential record address misses the BTC, determining whether the nonsequential record address hits or misses the pipelined cache;

(e) if the nonsequential record address hits the pipelined cache, providing the nonsequential record therefrom after the idle period; and (f) if the nonsequential record address misses the pipelined cache, providing the nonsequential record from the main memory.

2. The method of claim 1, the step (c) comprising the steps of:

during a first cycle of the idle period, the BTC providing the nonsequential record specified by the nonsequential record address; and during remaining cycles of the idle period, the BTC providing sequential records from sequential record addresses subsequent to the nonsequential record address.

3. The method of claim 1, the step (c) comprising the step of the BTC simultaneously providing W records during each cycle of the idle period, wherein the computer system is a superscalar system and W is the issue width of the system.

4. The method of claim 1, the step (c) comprising the steps of:

during a first cycle of the idle period, the BTC providing the nonsequential record specified by the nonsequential record address;

during the first cycle of the idle period, the BTC simultaneously providing W-1 sequential records from sequential record addresses subsequent to the nonsequential record address; and during the remaining cycles of the idle period, the BTC providing W sequential records during each cycle from sequential record addresses following the record address of the last record provided in a preceding cycle, wherein the computer system is a superscalar system and W is the issue width of the system.

5. The method of claim 1, the step (c) comprising the step of:

after the idle period, the piplined cache providing at least one sequential record from a sequential record address following the record address of the last record provided during the idle period by the BTC in a preceeding cycle.

6. The method of claim 1, wherein the nonsequential record is an instruction.

7. The method of claim 6, wherein the nonsequential record address is the target address of a branch instruction.

8. The method of claim 6, wherein the nonsequential record address is the starting address of an interrupt handler.

9. The method of claim 6, wherein the nonsequential record address is for call address of a subroutine.

10. The method of claim 6, wherein the nonsequential record address is the return address of a subroutine.

11. In a computer system for processing information, an improved on-chip cache having a low effective latency for nonsequential record accesses, the cache comprising:

a multistage pipelined cache for providing at least one cache output record in response to a record address hitting the pipelined cache, wherein the pipelined cache provides the record after an idle period of L clock cycles in which the pipelined cache provides no output records; and a branch target cache (BTC) for providing at least one record during the idle period in response to a nonsequential record address hitting the BTC.

12. The improved on-chip cache of claim 11, wherein W denotes the issue width of the computer system, A denotes the nonsequential record address, and A+(L×W) denotes a lookahead address, the cache further comprising:

a lookahead circuit for providing the nonsequential record address and the lookahead address to the pipelined cache during a zero cycle preceding the idle period, wherein the pipelined cache respectively provides a nonsequential record and a lookahead record from the lookahead address after the idle period in response to the nonsequential record address and the lookahead address hitting the pipelined cache; and a multiplexer for selecting the nonsequential record from the pipelined cache as an output of the improved cache if the nonsequential address misses the BTC, and for selecting the lookahead record as the output of the improved cache if the nonsequential address hits the BTC.

13. The improved on-chip cache of claim 12, wherein:

after the zero cycle the lookahead circuit provides to the pipelined cache at least one sequential record address subsequent to the lookahead address if the nonsequential address hits the BTC;

after the zero cycle the lookahead circuit provides to the pipelined cache at least one sequential record address subsequent to the nonsequential address if the nonsequential address misses the BTC; and the pipelined cache provides at least one record in response to the at least one sequential record address provided by the lookahead circuit hitting the pipelined cache.

14. The improved on-chip cache of claim 11, wherein W denotes the issue width of the computer system, A denotes the nonsequential record address, and A+(L×W) denotes a lookahead address, the cache further comprising:

a lookahead circuit for providing the lookahead address to the pipelined cache during a zero cycle preceding the idle period if the nonsequential address hits the BTC, wherein the pipelined cache provides a lookahead record from the lookahead address after the idle period in response to the lookahead address hitting the pipelined cache, the lookahead circuit further provides the nonsequential record address to the pipelined cache during the zero cycle if the nonsequential address misses the BTC, and the pipelined cache further provides a nonsequential record after the idle period in response to the nonsequential address hitting the pipelined cache; and a multiplexer for selecting the nonsequential record from the pipelined cache as an output of the improved cache if the nonsequential address misses the BTC, and for selecting the lookahead record as the output of the improved cache if the nonsequential address hits the BTC.

15. The improved on-chip cache of claim 14, wherein:

after the zero cycle the lookahead circuit provides to the pipelined cache at least one sequential record address subsequent to the lookahead address if the nonsequential address hits the BTC;

after the zero cycle the lookahead circuit provides to the pipelined cache at least one sequential record address subsequent to the nonsequential address if the nonsequential address misses the BTC; and the pipelined cache provides at least one record in response to the at least one sequential record address provided by the lookahead circuit.

16. The improved on-chip cache of claim 11, wherein during the first cycle of the idle period, the BTC provides a nonsequential record specified by the nonsequential record address; and during remaining cycles of the idle period, the BTC provides sequential records from sequential record addresses subsequent to the nonsequential record address.

17. The improved on-chip cache of claim 11, wherein the BTC simultaneously provides W records during each cycle of the idle period, wherein the computer system is a superscalar system and W is the issue width.

18. The improved on-chip cache of claim 11, wherein:

during the first cycle of the idle period, the BTC provides a nonsequential record specified by the nonsequential record address;

during the first cycle of the idle period, the BTC simultaneously provides W-1 sequential records from sequential record addresses subsequent to the nonsequential record address; and during remaining cycles of the idle period, the BTC provides W sequential records during each cycle from sequential record addresses following the record address of the last record provided in a preceding cycle, wherein the computer system is a superscalar system and W is the issue width of the system.

19. The improved on-chip cache of claim 11, wherein after the idle period, the pipelined cache provides at least one sequential record from a sequential record address following the record address of the last record provided during the idle period by the BTC in a preceding cycle.

20. The improved on-chip cache of claim 11, wherein if the nonsequential record address misses the BTC, the pipelined cache provides a nonsequential record after the idle period in response to the nonsequential record address hitting the pipelined cache.

21. The improved on-chip cache of claim 11, wherein each output record is an instruction.

22. The improved on-chip cache of claim 22, wherein the nonsequential record address is the target address of a branch instruction.

23. The improved on-chip cache of claim 21, wherein the nonsequential record address is the starting address of an interrupt handler.

24. The improved on-chip cache of claim 21, wherein the nonsequential record address is the call address of a subroutine.

25. The improved on-chip cache of claim 21, wherein the nonsequential record address is the return address of a subroutine.

26. A computer system having a low effective latency for nonsequential record accesses, the system comprising:

a processor for processing information;

a memory device coupled to the processor; and an improved on-chip cache, coupled to the processor, comprising:

a multistage pipelined cache for providing at least one cache output record in response to a record address hitting the pipelined cache, wherein the pipelined cache provides the record after an idle period of L clock cycles in which the pipelined cache provides no output records; and a branch target cache (BTC) for providing at least one output record during the idle period in response to a nonsequential record address hitting the BTC.

27. The computer system of claim 26, wherein W denotes the issue width of the computer system, A denotes the nonsequential record address, and A+(L×W) denotes a lookahead address, the on-chip cache further comprising:

a lookahead circuit for providing the nonsequential record address and the lookahead address to the pipelined cache during a zero cycle preceding the idle period, wherein the pipelined cache provides a nonsequential record and a lookahead record from the lookahead address after the idle period in response to the nonsequential record address and the lookahead address hitting the pipelined cache; and a multiplexer for selecting the nonsequential record from the pipelined cache as an output of the improved cache if the nonsequential address misses the BTC, and for selecting the lookahead record as the output of the improved cache if the nonsequential address hits the BTC.

28. The computer system of claim 27, wherein:

after the zero cycle the lookahead circuit provides to the pipelined cache at least one sequential record address subsequent to the lookahead address if the nonsequential address hits the BTC;

after the zero cycle the lookahead circuit provides to the pipelined cache at least one sequential record address subsequent to the nonsequential address if the nonsequential address misses the BTC; and the pipelined cache provides at least one record in response to the at least one sequential record address provided by the lookahead circuit.

29. The computer system of claim 26, wherein W denotes the issue width of the computer system A denotes the nonsequential record address, and A+(L×W) denotes a lookahead address, the on-chip cache further comprising:

a lookahead circuit for providing the lookahead address to the pipelined cache during a zero cycle preceding the idle period if the nonsequential address hits the BTC, wherein the pipelined cache provides a lookahead record from the lookahead address after the idle period in response to the lookahead address hitting the pipelined cache, the lookahead circuit further provides the nonsequential record address to the pipelined cache during the zero cycle if the nonsequential address misses the BTC, and the pipelined cache further provides a nonsequential record after the idle period in response to the nonsequential address hitting the pipelined cache; and a multiplexer for selecting the nonsequential record from the pipelined cache as an output of the improved cache if the nonsequential address misses the BTC, and for selecting the lookahead record as the output of the improved cache if the nonsequential address hits the BTC.

30. The computer system of claim 29, wherein:

after the zero cycle the lookahead circuit provides to the pipelined cache at least one sequential record address subsequent to the lookahead address if the nonsequential address hits the BTC;

after the zero cycle the lookahead circuit provides to the pipelined cache at least one sequential record address subsequent to the nonsequential address if the nonsequential address misses the BTC; and the pipelined cache provides at least one record in response to the at least one sequential record address provided by the lookahead circuit.

31. The computer system of claim 26, wherein during the first cycle of the idle period, the BTC provides a nonsequential record specified by the nonsequential record address; and during remaining cycles of the idle period, the BTC provides sequential records from sequential record addresses subsequent to the nonsequential record address.

32. The computer system of claim 26, wherein the BTC simultaneously provides W records during each cycle of the idle period, wherein the computer system is a superscalar system and W is the issue width.

33. The computer system of claim 26, wherein:

during the first cycle of the idle period, the BTC provides a nonsequential record specified by the nonsequential record address;

during the first cycle of the idle period, the BTC simultaneously provides W-1 sequential records from sequential record addresses subsequent to the nonsequential record address; and during remaining cycles of the idle period, the BTC provides W sequential records during each cycle from sequential record addresses following the record address of the last record provided in a preceding cycle, wherein the computer system is a superscalar system and W is the issue width of the system.

34. The computer system of claim 26, wherein after the idle period, the pipelined cache provides at least one sequential record from a sequential record address following the record address of the last record provided during the idle period by the BTC in a preceding cycle.

35. The computer system of claim 26, wherein if the nonsequential record address misses the BTC, the pipelined cache provides a nonsequential record after the idle period in response to the nonsequential record address hitting the pipelined cache.

36. The computer system of claim 26, wherein each output record is an instruction.

37. The computer system of claim 36, wherein the nonsequential record address is the target address of a branch instruction.

38. The computer system of claim 36, wherein the nonsequential record address is the starting address of an interrupt handler.

39. The computer system of claim 36, wherein the nonsequential record address is the call address of a subroutine.

40. The computer system of claim 36, wherein the nonsequential record address is the return address of a subroutine.

* * * * *

UNITED STATES PATENT AND TRADEMARK OFFICE
CERTIFICATE OF CORRECTION

PATENT NO.    : 5,561,782
DATED         : October 1, 1996
INVENTOR(S)   : Dennis O'Connor It is certified that error appears in the above-identified patent and that said Letters Patent is hereby corrected as shown below:

In column 7 at line 5 delete "eache114" and insert --cache 114--

In column 10 at line 56 delete "2 1 " and insert --11--

Signed and Sealed this

Twenty-ninth Day of April, 1997

Attest:

BRUCE LEHMAN

Attesting Officer        Commissioner of Patents and Trademarks